(12) United States Patent
Ritt

(10) Patent No.: US 8,104,134 B2
(45) Date of Patent: Jan. 31, 2012

(54) WINDSHIELD WIPER DEVICE

(75) Inventor: Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 1085 days.

(21) Appl. No.: 11/909,268

(22) PCT Filed: Jun. 12, 2006

(86) PCT No.: PCT/EP2006/063103
§ 371 (c)(1),
(2), (4) Date: Sep. 21, 2007

(87) PCT Pub. No.: WO2006/131567
PCT Pub. Date: Dec. 14, 2006

(65) Prior Publication Data
US 2008/0209659 A1    Sep. 4, 2008

(30) Foreign Application Priority Data

Jun. 10, 2005  (DE) .......................... 10 2005 028 118
Oct. 10, 2005  (DE) .......................... 10 2005 048 341

(51) Int. Cl.
*B60S 1/06*    (2006.01)
*B60S 1/04*    (2006.01)
(52) U.S. Cl. ................. 15/250.31; 15/250.3; 296/96.17; 248/229.11; 248/229.14; 403/322.4; 24/489; 24/494; 24/498
(58) Field of Classification Search ................. 15/250.3, 15/250.31; 403/74, 110, 234, 235, 256, 338, 403/322.4; 248/229.16, 229.26, 229.11, 248/229.14; 24/489, 494, 498; 296/96.15, 296/96.17
See application file for complete search history.

(56) References Cited

U.S. PATENT DOCUMENTS

| 554,091 | A | * | 2/1896 | Sears ........................... 248/27.5 |
| 1,602,457 | A | * | 10/1926 | Ritzwoller ................. 15/250.28 |
| 1,641,683 | A | * | 9/1927 | Malouf .................... 15/250.352 |
| 1,683,260 | A | * | 9/1928 | Polk ........................... 15/250.24 |
| 3,139,644 | A | * | 7/1964 | Smith ......................... 15/250.3 |
| 6,948,878 | B1 | * | 9/2005 | Smith et al. .................. 403/110 |
| 7,222,385 | B1 | * | 5/2007 | Borg ........................... 15/250.3 |
| 7,743,457 | B2 | | 6/2010 | Metz |
| 2005/0039290 | A1 | * | 2/2005 | Morin et al. ................. 15/250.3 |
| 2006/0168754 | A1 | * | 8/2006 | Metz .......................... 15/250.31 |
| 2007/0011839 | A1 | | 1/2007 | Princet et al. |

FOREIGN PATENT DOCUMENTS

| DE | 10327858 A1 | 1/2005 |
| EP | 0950586 A2 | 10/1999 |
| FR | 2853606 A | 10/2004 |
| JP | 57194140 | 11/1982 |
| WO | 2006/072486 A2 | 7/2006 |

OTHER PUBLICATIONS

PCT/EP2006/063103 International Search Report.

* cited by examiner

*Primary Examiner* — Gary Graham
(74) *Attorney, Agent, or Firm* — Michael Best & Friedrich LLP

(57) ABSTRACT

The invention relates to a windshield wiper device, in particular for a motor vehicle, comprising a fastening device (10) for fastening the windshield wiper device to the motor vehicle. Until now windshield wiper devices were mainly fastened to the vehicle body by means of screwed connections and plugging locations. The objective of the invention is reducing the assembly effort for fastening the windshield wiper device to the vehicle body. As a result, the inventive windshield wiper device can be clamped firmly to a vehicle body panel (13) by the fastening device (10).

23 Claims, 4 Drawing Sheets

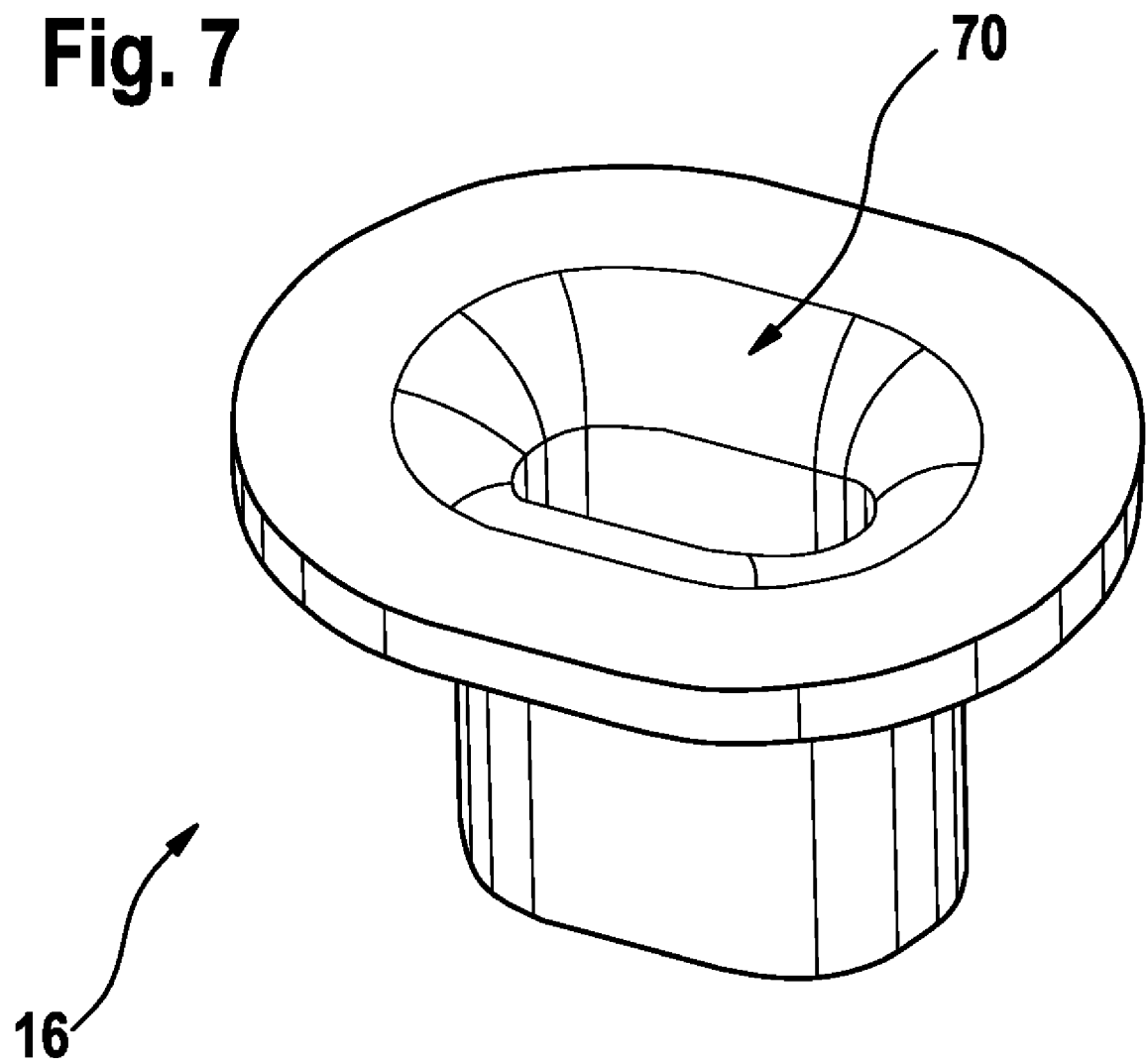

WINDSHIELD WIPER DEVICE

BACKGROUND OF THE INVENTION

The invention relates to a windshield wiper device, in particular for a motor vehicle, comprising a fastening device for fastening the windshield wiper device to the motor vehicle.

Until now windshield wiper devices were mainly fastened to the vehicle body by means of screwed connections and plugging locations. Special tools, multiple assembly manipulations and therefore a relatively great amount of time are required for this.

The objective of the invention is reducing the assembly effort for fastening the windshield wiper device to the vehicle body.

The invention attains the stated objective with a windshield wiper device of the type cited at the outset, which, according to the invention, can be clamped firmly to a vehicle body panel by the fastening device. The windshield wiper device can be fastened to the vehicle body in this way without screws or plugging locations. Consequently, mounting the windshield wiper device requires considerably less time than before. Special tools for assembly can also be eliminated.

SUMMARY OF THE INVENTION

The fastening device can have at least one resilient clamping element, which is provided in particular with at least two guide surfaces. A vehicle body panel can be inserted between the at least two guide surfaces. The resilient property of the clamping element makes it possible to compensate for different thicknesses of the vehicle body panel.

In order to be able to clamp the vehicle body, the guide surfaces can be arranged so that they can move towards one another.

The fastening device can have a snap lever, made particularly of plastic, which is positioned eccentrically and pivotably in an axis situated in a bracket. Due to the pivoting of the snap lever and its eccentric positioning, the guide surfaces can be moved towards one another with a single manual manipulation in order to firmly clamp the windshield wiper device to the vehicle body.

If the bracket has an undulated region, then this region is extended when the snap lever is pivoted, whereby the waves of the undulated region become flatter. Tolerances in the thickness of the vehicle body panel can be compensated for in this manner.

The fastening device can have at least one rubber buffer and/or a spacer sleeve. The rubber buffer also compensates for tolerances in the thickness of the vehicle body panel. The spacer sleeve prevents the rubber buffer from being compressed too much.

So that the spacer sleeve can reliably prevent the rubber buffer from being compressed too much, said spacer sleeve has an inner hole, which extends tubularly towards the vehicle body panel.

The snap lever can have an elongated form so that it can be operated easily. It can be locked by a movement, in particular of between 40° and 100°, preferably of between 45° and 95° transverse to its longitudinal axis. In this position, the guide surfaces are spaced apart from one another so that the vehicle body panel can be inserted between the guide surfaces.

The snap lever can have support surfaces in order to lock it in a closed position, i.e., after mounting has been completed, or in an assembly position, i.e., for the purpose of mounting.

So that the clamping element can be locked to the body of the motor vehicle, it can have at least one spring leg, which can engage in a recess in the body panel.

In order to secure the snap lever in the closed position, it can be provided with a hook, which, in the closed position, engages in a recess provided for this purpose.

The guide surfaces can be roughed up on their respective facing sides. This increases the friction of the guide surfaces on the vehicle body in a clamped state.

The snap lever can be manufactured especially favorably if it is manufactured of an unreinforced or fiber reinforced plastic or of a metal diecast.

The fastening of the windshield wiper device to the vehicle body can be realized very simply if the fastening device is arranged on a molded tube.

BRIEF DESCRIPTION OF THE DRAWINGS

A preferred exemplary embodiment will be explained in greater detail in the following on the basis of the enclosed drawings.

The drawings show in detail:

FIG. 7 A perspective top view of a spacer sleeve.

DETAILED DESCRIPTION

Figure 1:
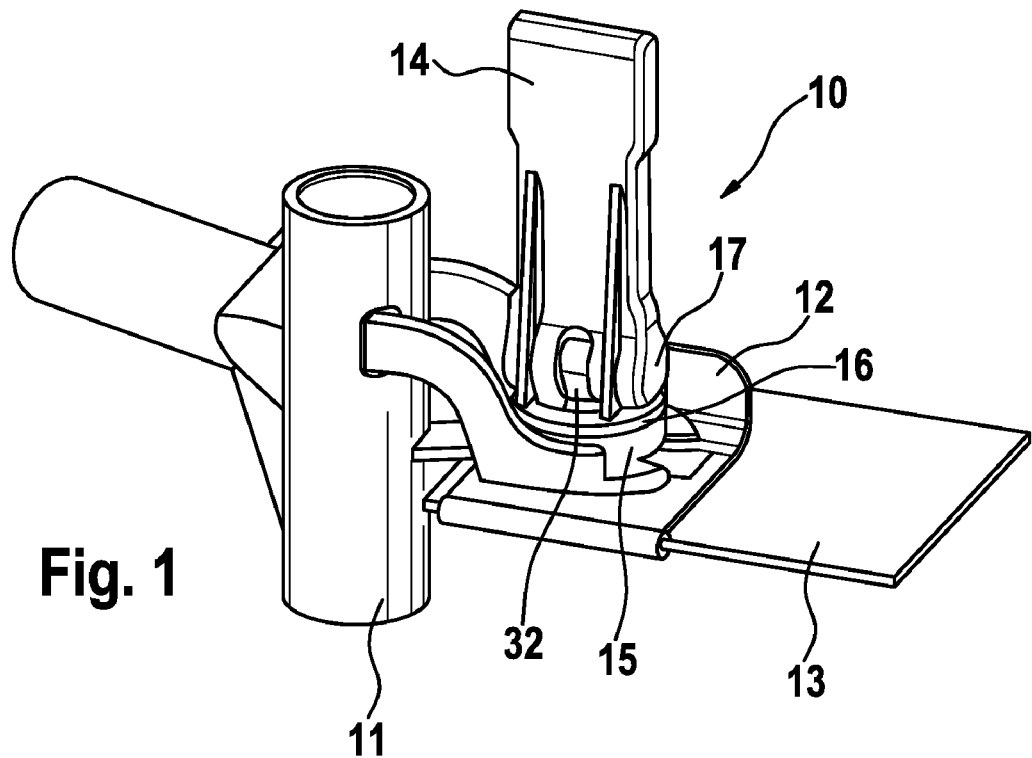
FIG. 1 A perspective view of a fastening device in accordance with the invention in an opened state.
Figure 2:
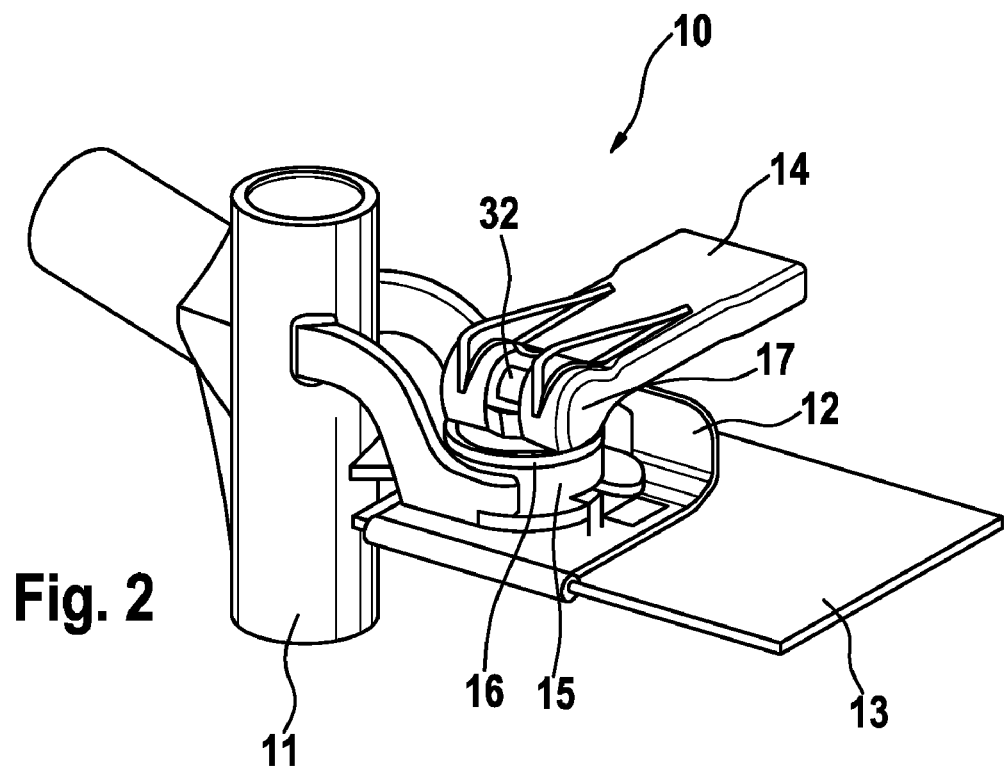
FIG. 2 A perspective view of the fastening device in accordance with the invention in a closed state.

FIGS. 1 and 2 show a fastening device 10, which is arranged on a molded tube 11. The fastening device 10 has a clamping element 12, between which a vehicle body panel 13 is clamped. In addition, the fastening device 10 is provided with a snap lever 14, a rubber buffer 15 and a spacer sleeve 16.

Figure 3:
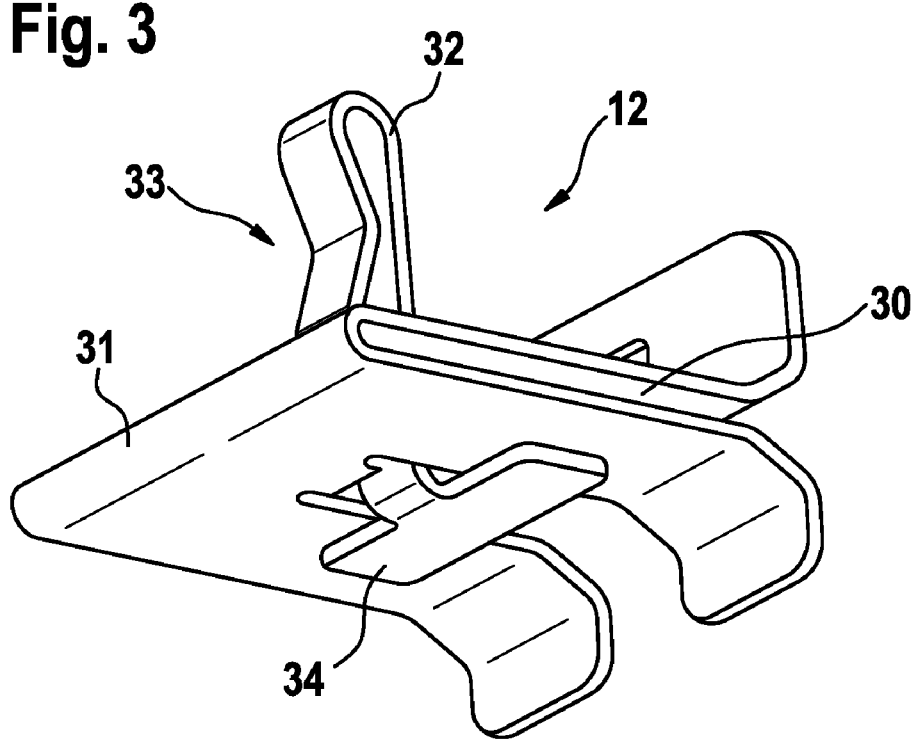
FIG. 3 A perspective view from below of a spring element.
Figure 4:
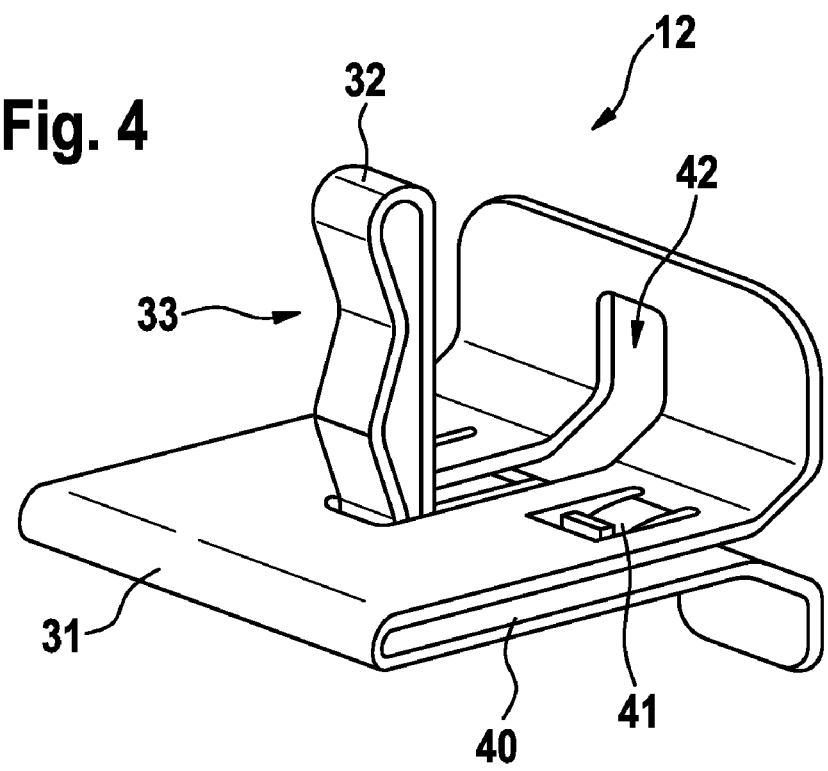
FIG. 4 A perspective top view of the spring element from FIG. 3.

The clamping element 12 has two guide surfaces 30 (see FIG. 3) and 40 (see FIG. 4), between which the vehicle body panel 13 can be slid. The guide surfaces 30 and 40 are connected resiliently with one another by means of a bent area 31. The bent area 31 also serves as a limit stop for the vehicle body panel 13.

The clamping element 12 features a bracket 32, which is provided with an undulated region 33. The bracket 32 is provided on its free end with a support element 34, which presses against the underside of the guide surface 40 from below (see FIG. 3).

The snap lever 14 is positioned eccentrically and pivotably in an axis 17 situated in a bracket 32 (FIGS. 1 and 2).

In order to insert the vehicle body panel 13 between the guide surfaces 30 and 40, the snap lever 14 is situated in an assembly position (see FIG. 1).

As soon as the vehicle body panel 13 is slid between the guide surfaces 30 and 40, the snap lever 14 is pivoted to the right into a closed position. Because of the eccentric positioning of the snap lever 14 on the axis 17, said lever is simultaneously pressed upwards during its rightward pivoting thereby pulling the bracket 32 upwards. At the same time, the support element 34 below is pressed against the underside of the guide surface 40 so that the vehicle body panel 13 situated between the guide surfaces 30 and 40 is clamped firmly.

Figure 5:
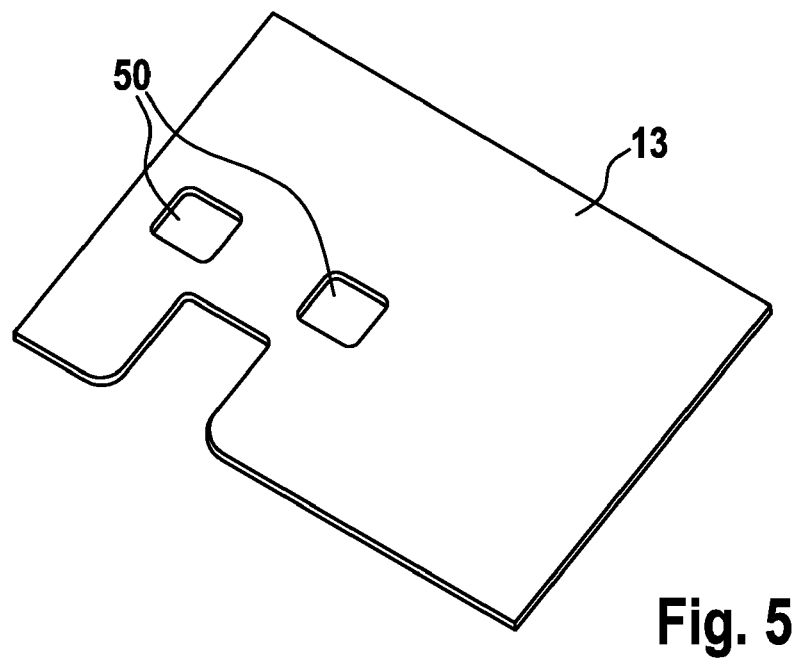
FIG. 5 A perspective view of a vehicle body panel.

The clamping element 12 is provided with two spring legs 41 (see FIG. 4), which engage in recesses 50 (see FIG. 5)

provided in the vehicle body panel 13. As a result, the vehicle body panel 13 is also locked between the two guide surfaces 30 and 40.

Figure 6:
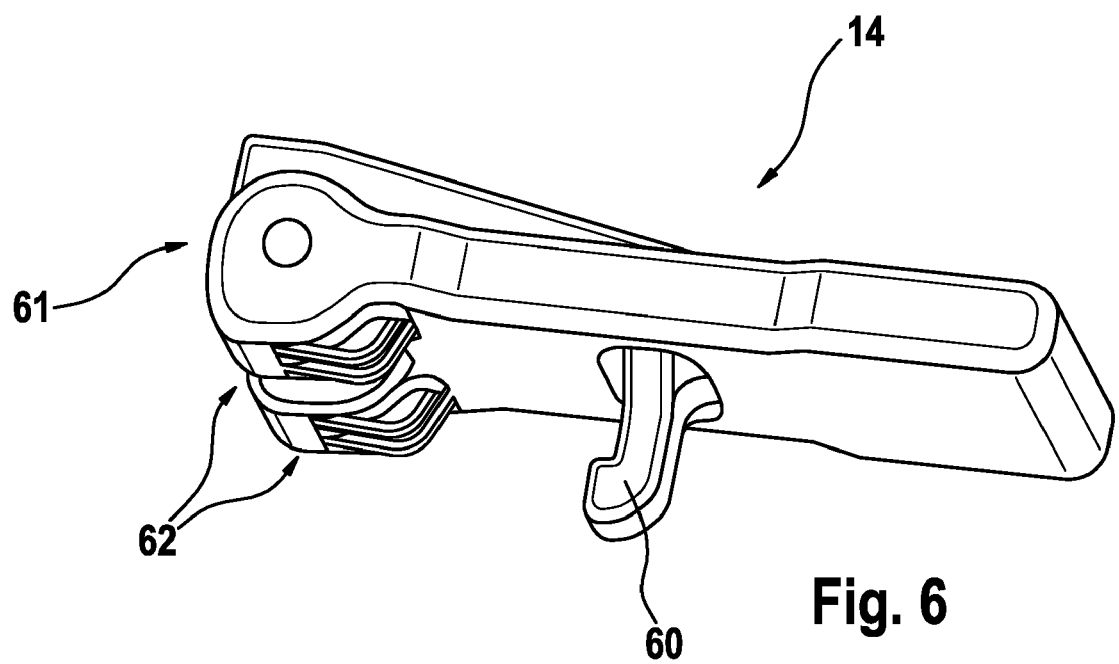
FIG. 6 A perspective side view of a snap lever.

The snap lever 14 features a hook 60 (see FIG. 6) which can engage in a recess 42 in the clamping element 12 in order to prevent unintentional opening of the snap lever 14.

Furthermore, the snap lever 14 is provided with support surface 61 and 62 (see FIG. 6), which lock the snap lever 14 in its closed position and in its assembly position.

The spacer sleeve 16 features an inner hole 70 (see FIG. 7), which extends tubularly towards the vehicle body panel. As a result, the spacer sleeve 16 prevents the rubber buffer 15 from being compressed too much when the snap lever 14 is pivoted to the right into its closed position.

The invention claimed is:

1. Windshield wiper device, comprising a fastening device (10) for fastening the windshield wiper device to a motor vehicle, characterized in that the fastening device (10) includes a resilient clamping element (12) having resiliently-coupled guide surfaces (30, 40) engageable with opposite surfaces of a vehicle body panel (13) and a snap lever (14) pivotable about an axis (17) generally parallel to the guide surfaces (30, 40) between an opened state and a closed state, the lever (14) being arranged on the clamping element (12) to move the guide surface (30, 40) closer together during movement from the opened state toward the closed state so that the windshield wiper device is clamped firmly to the vehicle body panel (13) by the fastening device (10).

2. Windshield wiper device according to claim 1, characterized in that the snap lever (14) is positioned eccentrically and pivotably in the axis (17) situated in a bracket (32).

3. Windshield wiper device according to claim 2, characterized in that the bracket (32) has an undulated region (33).

4. Windshield wiper device according to claim 2, characterized in that the snap lever (14) has an elongated form and is locked in the closed state by a movement transverse to its longitudinal axis.

5. Windshield wiper device according to claim 2, characterized in that the snap lever (14) has support surfaces (61, 62) in order to lock the snap lever in at least one of the closed position and an assembly position.

6. Windshield wiper device according to claim 2, characterized in that the snap lever (14) is provided with a hook (60) engageable in a recess (42) in the clamping element (12).

7. Windshield wiper device according to claim 1, characterized in that the fastening device (10) has at least one of a rubber buffer (15) and a spacer sleeve (16).

8. Windshield wiper device according to claim 7, characterized in that the spacer sleeve (16) has an inner hole (70), which extends tubularly towards the vehicle body panel (13).

9. Windshield wiper device according to claim 1, characterized in that the clamping element (12) has at least one spring leg (41) engageable in a recess (50) in the body panel (13) of the motor vehicle.

10. Windshield wiper device according to claim 1, characterized in that the guide surfaces (30, 40) are roughed up on their respective facing sides.

11. Windshield wiper device according to claim 1, characterized in that the snap lever (14) is manufactured of one of an unreinforced plastic, a fiber reinforced plastic, and a metal diecast.

12. Windshield wiper device according to claim 1, characterized in that the fastening device (10) is arranged on a molded tube (11).

13. Windshield wiper device according to claim 1, wherein the snap lever (14) is made of plastic.

14. Windshield wiper device according to claim 1, characterized in that the snap lever (14) has an elongated form and can be locked by a movement of between 40° and 100° transverse to its longitudinal axis.

15. Windshield wiper device according to claim 1, characterized in that the snap lever (14) has an elongated form and can be locked by a movement of between 45° and 95° transverse to its longitudinal axis.

16. Windshield wiper device according to claim 1, characterized in that the snap lever (14) is positioned on a side of one guide surface (30) opposite the other guide surface (40), in that a support element (34) is positioned on a side of the other guide surface (40) opposite the one guide surface (30) and opposite the snap lever (14), and in that the snap lever (14) is connected to the support element (34) to cause the support element (34) to move the other guide surface (40) toward the one guide surface (30) during movement from the opened state toward the closed state.

17. Windshield wiper device according to claim 16, characterized in that a bracket (32) is connected between the snap lever (14) and the support element (34).

18. Windshield wiper device according to claim 17, characterized in that the bracket (32) defines the axis (17).

19. Windshield wiper device, comprising a fastening device (10) for fastening the windshield wiper device to a motor vehicle, characterized in that the fastening device (10) includes a resilient clamping element (12) having guide surfaces (30, 40) engageable with opposite surfaces of a vehicle body panel (13) and an actuator movable between an opened state and a closed state, the actuator being arranged on the clamping element (12) to move the guide surfaces (30, 40) closer together during movement from the opened state toward the closed state so that the windshield wiper device is clamped firmly to the vehicle body panel (13) by the fastening device (10), the actuator being positioned on a side of one guide surface (30) opposite the other guide surface (40), in that a support element (34) is positioned on a side of the other guide surface (40) opposite the one guide surface (30) and opposite the actuator, and in that the actuator is connected to the support element (34) to cause the support element (34) to move the other guide surface (40) toward the one guide surface (30) during movement from the opened state toward the closed state.

20. Windshield wiper device according to claim 19, characterized in that the actuator includes a snap lever (14) pivotable about an axis (17) between the opened state and the closed state.

21. Windshield wiper device according to claim 20, characterized in that a bracket (32) is connected between the snap lever (14) and the support element (34).

22. Windshield wiper device according to claim 21, characterized in that the bracket (32) defines the axis (17).

23. Windshield wiper device according to claim 19, characterized in that a bracket (32) is connected between the actuator and the support element (34).

* * * * *